July 19, 1960
H. A. BALL
2,945,632
SOLENOID OPERATED SPRAY APPARATUS
Filed Oct. 21, 1955
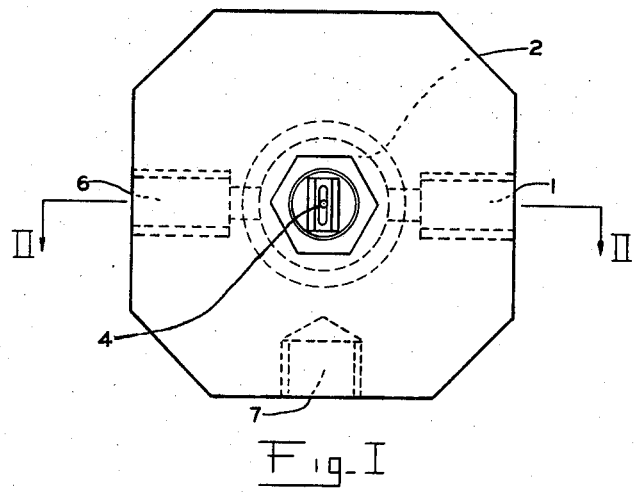
Fig. I
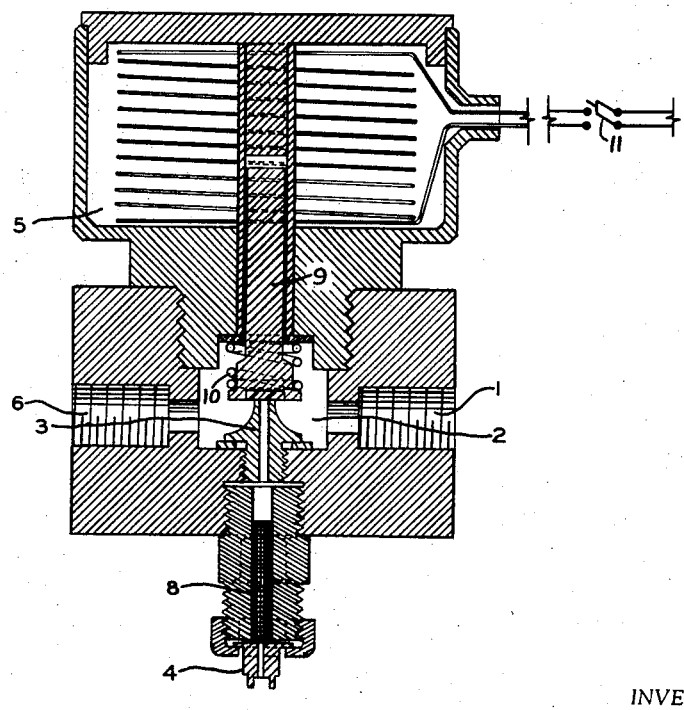
Fig. II
INVENTOR
HENRY A. BALL
BY *Lloyd F. Engle, Jr.*
ATTORNEY United States Patent Office 2,945,632
Patented July 19, 1960

2,945,632

SOLENOID OPERATED SPRAY APPARATUS

Henry A. Ball, Glenshaw, Pa., assignor to The Cleanola Company, Glenshaw, Pa., a corporation of Pennsylvania Filed Oct. 21, 1955, Ser. No. 541,988

4 Claims. (Cl. 239—583)

This invention pertains to coating apparatus for applying coatings to objects. More particularly this invention relates to mechanically controlled apparatus for applying thin film-forming coating composition attenuated by a volatile carrying liquid to objects without the use of air.

The apparatus in prior use for applying coatings to objects have fundamentally comprised a spray orifice to which the flow of coating material was controlled by a valve placed either proximate to or remote from the said orifice. Under conditions where the said valve was remote from the said orifice, a quantity of the coating composition which remained in the system between the valve and the orifice, when the valve was closed, was lost and often caused troublesome restricting of the system. In all instances the valve was operated by a stem or rod which passed through packing and extended outside the structure of the apparatus and, upon repeated use of the valve, the resultant wear on the component parts and deterioration of the packing permitted leakage of the coating composition from the system around the said stem or rod.

Therefore, one object of this invention is to provide an apparatus for applying a thin uniform coating to objects in which none of the moving elements extends outside the structure of the said apparatus. A further object of this invention is to eliminate the difficulty of residual coating composition restricting or plugging the system. A further object of this invention is to reduce waste or loss of the coating composition to a minimal amount. A still further object of this invention is to eliminate the excess air from the coating composition and to reduce premature oxidation thereby. Further and additional objects will appear from the following description and the appended claims.

Briefly to describe the primary features of a coating apparatus embodying my invention, I provide a housing having an inlet for coating composition connecting with a chamber within the said housing; a shut-off valve seat within the said chamber which cooperates with mechanical means to interrupt the discharge of coating composition; a nozzle communicating with the said shut-off valve seat; and an outlet for the coating composition communicating with the said chamber to permit the continuous circulation and reheating of the said coating composition. The restricted condition of the orifice of the said nozzle is such that when the attenuated coating composition is projected therefrom under the influence of heat-reduced viscosity and mechanical pressure it is resolved by the abrupt release of the said pressure into the condition of a propelled free cloud. The valve operating mechanism is an encased solenoid having as its sildable core a valve stem and is threaded into a receptacle in the housing thereby completely enclosing the valve so that no element of the said valve extends outside the structure of the coating apparatus. Upon assembly of the component parts of said valve stem engages the said valve seat and can be withdrawn therefrom by actuation of the said solenoid. Relative-movement between the object to be coated and the said coating apparatus causes the said object to intersect the propelled free cloud of coating composition and the film-forming content thereof adheres to the said object.

Fig. I is an elevational view of my coating apparatus.

Fig. II is a cross-sectional view through my coating apparatus taken in the plane of section line II—II of Fig. I.

Referring to the drawings, the numeral 1 indicates an inlet for the coating composition from the supply system (not shown) into the chamber 2. A shut-off valve seat 3 is mounted within the said chamber 2 and communicates with the nozzle 4 to conduct the coating composition thereto when the coating apparatus is in operation. The said valve seat 3 cooperates with the valve stem 9 which is the slidable core of the solenoid mechanical means 5, shown in Fig. II, for which a threaded receptacle is provided in the said housing, to interrupt the flow of coating composition to the said nozzle 4. A helical spring 10 engages the valve stem 9 and firmly compresses the valve stem 9 against the valve seat 3 when the solenoid 5 is not actuated. Actuation of the solenoid 5 by the switch control 11 withdraws the valve stem 9 from the valve seat 3. An outlet 6 communicates with the said chamber 2 to conduct the coating composition back into the supply system for reheating. A threaded receptacle 7 in the body of the housing affords an engagement for a mounting rod or handle (not shown) for the coating apparatus. A straining screen 8 is inserted into the nozzle body to prevent clogging of the nozzle orifice which may result from solid foreign matter occurring in the coating composition.

An important feature of the novelty of my invention is found in the arrangement of the structure comprising a shut-off valve in close proximity to the nozzle and having all of its component parts entirely enclosed within the structure. This arrangement permits the interruption of the coating operation without allowing the run out of any liquid coating composition and at the same time permits the continued circulation of the coating composition through the coating apparatus and the supply system for the immediate resumption of operation, and also prevents any leakage of the liquid coating composition which might otherwise result from wear on the valve stem or rod, or deterioration of packing.

An additional important feature is found in the versatility of the apparatus comprising a shut-off valve operated by mechanical means of the solenoid type which may be controlled from a remote position even though the said valve is proximate to the said nozzle. The use of flexible conduit for the supply and return system facilitates mobility of the coating apparatus and allows practically unlimited extension from the source of supply. This arrangement permits the insertion of the coating apparatus embodying my invention into places and objects inaccessible to apparatus in prior use in the art. Also a plurality of the apparatuses embodying my invention may be mounted in series on the same supply system and be controlled either separately or in unison.

The coating composition contemplated for the proper functioning of my coating apparatus comprises a film-forming material attenuated by a volatile carrying liquid which is introduced from the supply system into the coating apparatus at a temperature of from 100° to 200° F. and under mechanical pressure of from 300 to 500 pounds per square inch. The nozzle orifice is restricted in size so that in an order of heat-reduced viscosity and abrupt release of the mechanical pressure at the exterior terminus of the said orifice the coating composition is resolved into the condition of a propelled free cloud thereby liberating a proportion of the volatile liquid comprised in the said coating composition during passage to the object being coated (not shown) while adhering to the said object the film-forming material which hardens and becomes heat stable upon application.

I have operated the apparatus embodying my invention successfully by applying a mechanical pressure of 400 pounds per square inch to the attenuated coating composition which was heated to 180° F. Under these conditions the coating composition was resolved into a finely dispersed free cloud upon issuance from the nozzle having an orifice .011 inch in diameter and no condensation of the coating composition into liquid droplets during passage from the nozzle to the object being coated was observable. When a relative movement of 300 feet per minute was effected between my coating apparatus and the object being coated, the resultant wet coating on the said object so intersecting the propelled free cloud of coating composition was .001 inch thick which produced a uniform dry coating .00045 inch thick and the flow thereof was negligible.

To determine the quantitative disposition of the coating composition accomplished by the apparatus embodying my invention, operations were conducted using a coating composition comprising 50 percentum of film-forming solid material and 50 percentum of volatile carrying liquid by weight, the film-forming solid material comprising drying oils, dryer catalysts and resins and the volatile carrying liquid comprising naphtha. The coating composition so constituted was presented to my coating apparatus at a temperature of 180° F. and under mechanical pressure of 400 pounds per square inch and was projected from the nozzle thereof into a container which was immediately sealed. Subsequent analysis of the material collected in the said container determined that it was comprised 55 percentum of film-forming solid material and 45 percentum of volatile carrying liquid by weight, from which it is concluded that, in actual productive operation of my coating apparatus, the liberation of a similar proportion of the volatile carrying liquid comprised in the coating composition will occur during passage from the nozzle to the object being coated.

Variations of the pressure, temperature, speed of relative movement, and constituency of the coating composition may be made to effect a wide range of desired coating results. The thin uniform coatings which the practice of these variations enables my coating apparatus to produce range from .0003 inch to .025 inch in thickness in the dry state.

Certain changes may be made in the arrangement set forth in the specification and shown in the drawings, it being understood that modifications in the precise embodiment of the invention may be made within the scope of the following claims without departing from the spirit of the invention.

I claim as my invention:
1. In a high pressure airless spray device for applying a thin film of coating material to an object, a housing having interior walls defining a chamber therein and having an inlet for coating material extending through one of said walls, a valve member engaging said housing and projecting into said chamber, said valve member having a seat spaced from one of said walls and having a central passage extending therethrough, said valve member being formed of rigid unyielding material, a spray nozzle member mounted in said housing extending outwardly therefrom and having a passage communicating with said passage in said valve member and having an orifice so restricted that under pressure delivery of the said coating material therefrom issuance tends to resolve the said coating material into the condition of a propelled free cloud, a spring loaded valve stem projecting into said chamber and having a resilient portion cooperating with the said valve seat to cause said valve stem to engage said seat to interrupt the flow of coating material therethrough, and mechanical operative means for actuating said valve stem away from said seat, said means engaging the said housing and cooperating therewith to entirely enclose the component parts of the said valve.

2. A high pressure airless spray device as set forth in claim 1, wherein said housing is provided with an outlet for coating material, whereby continued circulation and conditioning of the coating material may be obtained.

3. A high pressure airless spray as set forth in claim 1, wherein a solenoid slidably engages said valve stem as its core.

4. A high pressure airless spray as set forth in claim 1, wherein the seat of said valve member is flat, and wherein the valve seat engaging portion of said valve stem is flat and extends in a plane parallel to the plane in which said valve seat extends.

References Cited in the file of this patent

UNITED STATES PATENTS

| | | |
|---|---|---|
| 1,060,089 | Higgins | Apr. 29, 1913 |
| 1,888,684 | Middleton | Nov. 22, 1932 |
| 2,239,987 | Bramsen | Apr. 29, 1941 |
| 2,619,116 | Ralston | Nov. 25, 1952 |
| 2,681,829 | Wahlin | June 22, 1954 |
| 2,705,663 | Gilbreath | Apr. 5, 1955 |
| 2,745,625 | Booth | May 15, 1956 |
| 2,805,689 | De Groat | Sept. 10, 1957 |

FOREIGN PATENTS

| | | |
|---|---|---|
| 484,607 | Canada | July 8, 1952 |